Nov. 7, 1950          L. W. YOUNG          2,528,809
BLOWPIPE APPARATUS
Filed March 20, 1946          2 Sheets-Sheet 1
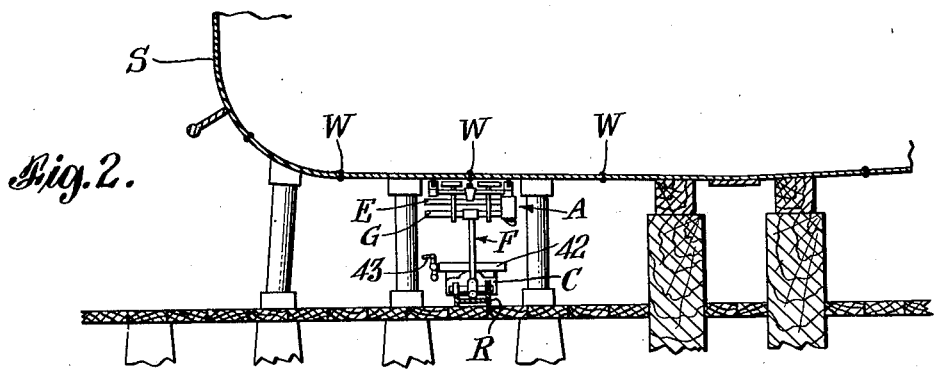
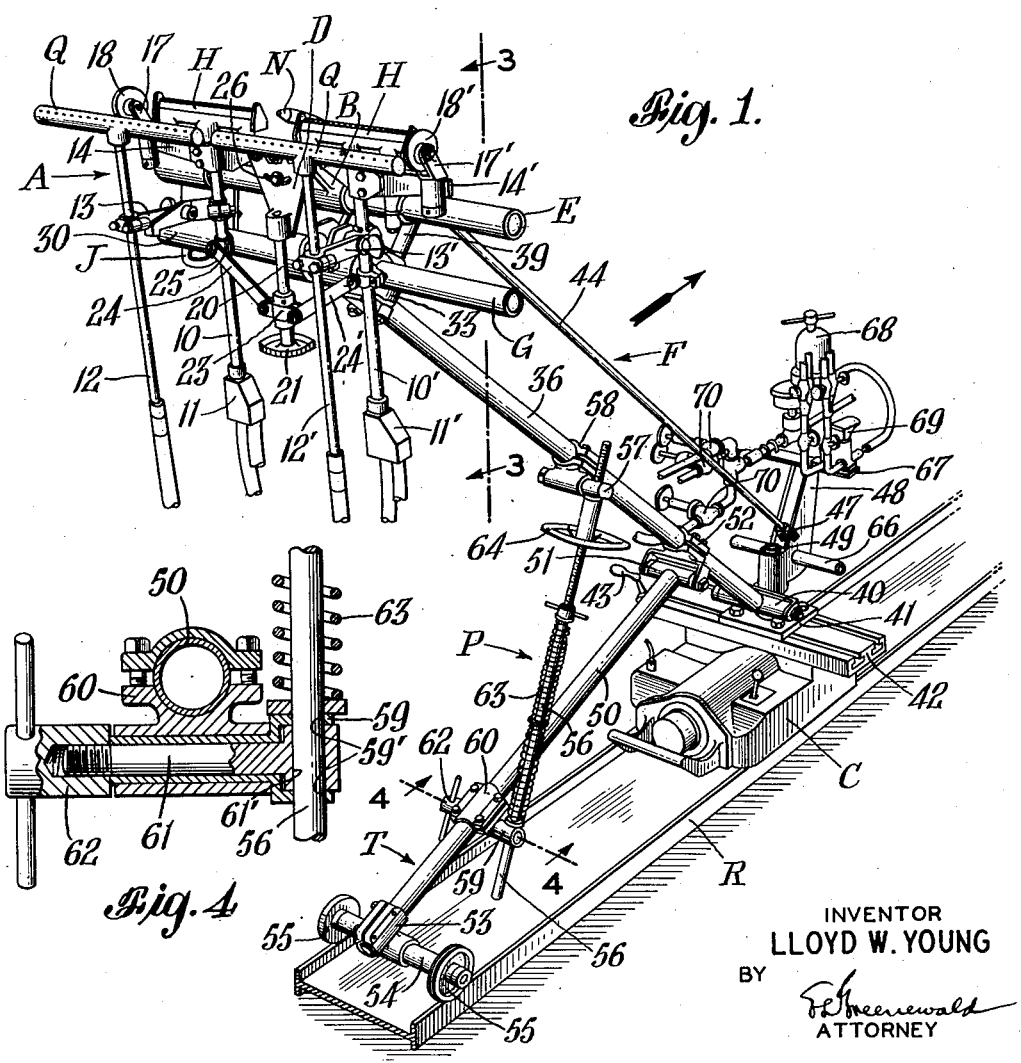
INVENTOR
LLOYD W. YOUNG
BY
       ATTORNEY

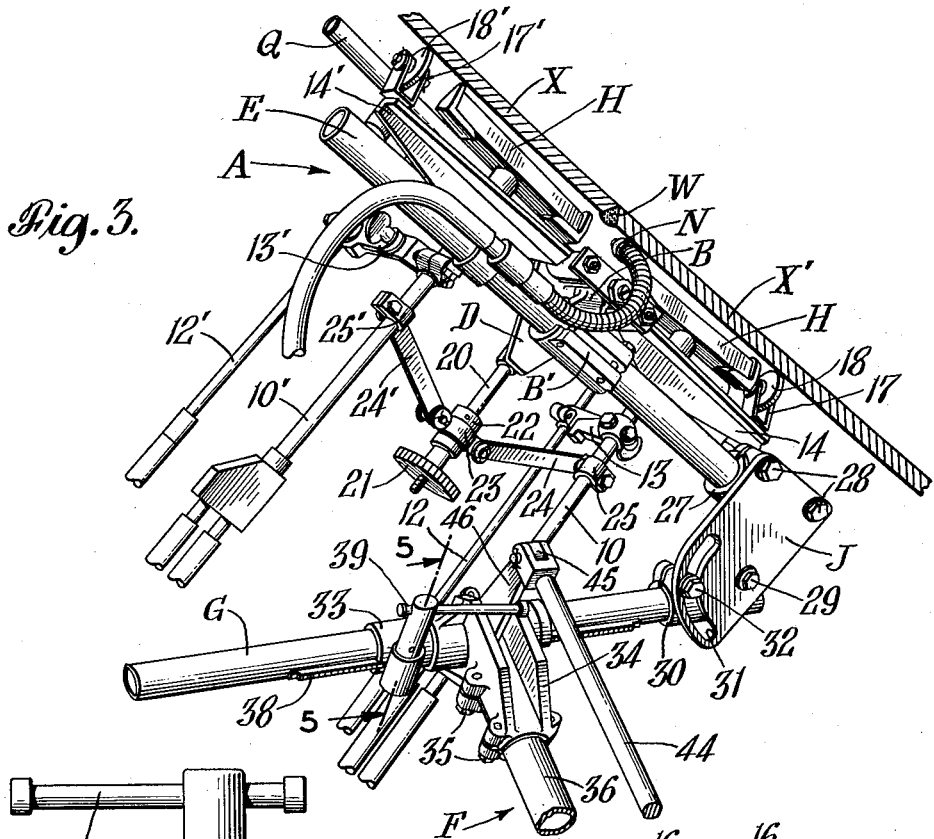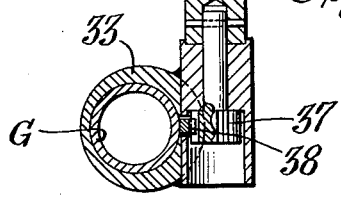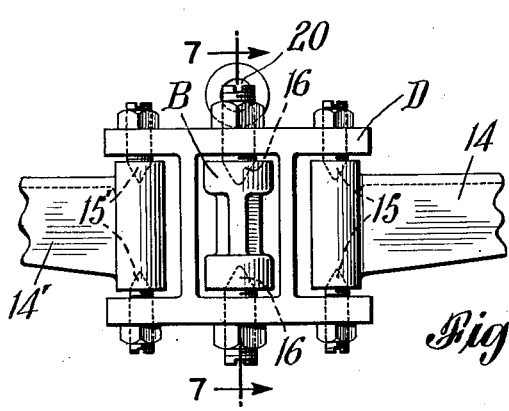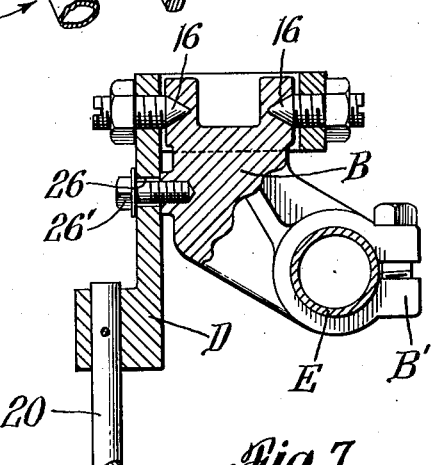

Patented Nov. 7, 1950

2,528,809

UNITED STATES PATENT OFFICE 2,528,809

BLOWPIPE APPARATUS

Lloyd W. Young, Elizabeth, N. J., assignor to The Linde Air Products Company, a corporation of Ohio Application March 20, 1946, Serial No. 655,785

21 Claims. (Cl. 266—4)

This invention relates to blowpipe apparatus, and more particularly to apparatus useful for relieving residual or locked-up stresses occurring in metal members which have been subjected to localized intense heat such as that employed in welding or cutting metal plates, for example.

When a weld is made in a large mass of metal, or when large metal members are joined by long welds, the expansion and contraction of metal at the weld zone under the influence of heating and cooling is restrained by the large adjoining mass of metal that is not affected by the welding heat. In the case of fusion-deposition welding, where a long deposit of molten metal is produced, contraction of the deposited metal on cooling is restrained by the base metal. As a result of this restraint, large residual stresses are retained in the welded structure.

It has been observed that the principal residual stress in a welded structure consisting of two or more large metal plates joined by butt welds exists along the line of the deposited weld metal and the closely adjacent base metal. This stress is referred to as the longitudinal stress. It is a tensile stress; its highest unit stress approximates the room-temperature yield strength of the metal of which the weld zone is composed. Parallel with this stress and on each side of the weld and usually equally spaced from it are two complementary compression stresses of large magnitude. Transverse to the weld are stresses, generally compression, of relatively low magnitude except at each end of the weld where, in the case of long welds, the highest unit stress may approach the yield strength of the metal. This stress pattern is produced in all welded structures where the weld zone is restrained, whether the weld is made manually or by automatic methods.

As disclosed in the co-pending application Serial No. 607,386, filed July 27, 1945, now abandoned, by Hans R. Pufahl and Lloyd W. Young, the present technique for relieving these residual stresses in welded structures consists of advancing along the weld zone two gas heating heads followed by two water quenching heads; one heating head and one quenching head being positioned to travel along and adjacent each side of the weld. A quenching nozzle is positioned in the region between these heating and quenching heads so as to direct a water quenching jet against the weld and rearwardly or opposite to the direction of travel of the heating and quenching heads, to prevent excessive temperature rise at the weld. Satisfactory application of this stress-relieving technique requires that the relation of the heating and quenching devices with respect to the welded members and weld zone be held constant, which has presented a difficult problem in stress-relieving operations on non-planar structures and particularly in overhead operations, such as those on the undersides of welded hulls of ships where horizontal, inclined and curved surface contours are encountered.

The principal objects of this invention are: to provide a blowpipe apparatus useful in efficiently performing stress-relieving operations on welded structures whose surfaces are undulating or non-planar; to provide a blowpipe apparatus whose heating head or heads, with or without quenching means, is adjustable to various positions to effectively apply heat to surfaces of differing contour; to provide a blowpipe apparatus especially useful in performing heating or stress-relieving operations on the undersides of welded steel structures such as the welded hulls of ships; and to provide a power-driven stress-relieving apparatus adjustable to hold elongated heating heads and elongated quenching heads in a fixed relation with respect to a long weld zone while the apparatus is propelled along said zone and regardless of undulations of the surface contour of the structure containing said zone.

The above and other objects, and the novel features of this invention will become apparent from the following description considered in conjunction with the accompanying drawings, in which:

Fig. 1 is a perspective view illustrating a blowpipe apparatus embodying the principles of this invention and useful for stress relieving welded zones in welded structures having undulating surface contours along the welded zones;

Fig. 2 is a view illustrating a section of a welded hull of a ship and showing the apparatus of this invention in position to perform an overhead stress-relieving operation on a weld zone extending along the underside of the ship's hull;

Fig. 3 is an enlarged perspective view looking in the direction of the arrows on line 3—3 of Fig. 1 and illustrating the heating heads, quenching heads, and their associated mechanism adjusted to an angular position to perform a stress-relieving operation along a weld zone in an inclined portion of a ship's bottom or other welded structure;

Fig. 4 is a sectional view along the line 4—4 of Fig. 1, illustrating the construction of a brace rod and spring abutment;

Fig. 5 is an enlarged sectional view along the line 5—5 of Fig. 3, illustrating a horizontal adjustment means;

Fig. 6 is an enlarged plan view of the pivot holder for pivotally mounting the spacing wheel brackets, the heating heads and the quenching heads; and Fig. 7 is a view, partly in section, on the line 7—7 of Fig. 6, showing parts of the elements to which the pivot holder is connected.

The principles of this invention are shown as embodied in a machine for use in relieving residual stresses induced in a butt-welded steel plate structure, such as the hull plating of a ship or other multi-plate structures where long runs of welding have been employed to unite flat or curved plates in either horizontal or inclined relation; and particularly for use in applying heating flames and quenching jets uniformly against weld zones along the undersides of such structures, as in Fig. 2 which illustrates how a stress-relieving operation is performed on a ship's hull S by apparatus embodying this invention.

As shown in Figs. 1 and 3, the improved apparatus comprises a stress-relieving assemblage A mounted at the upper end of a vertically movable frame F which has its lower end pivotally connected to a support, such as a motor-driven carriage C, movable along a track R installed below and parallel to the weld zone to be treated. The assemblage A is thus movable toward and away from the weld zone and spring-loading mechanism P is provided to yieldingly and automatically press the assemblage toward and against the butt-welded plate while the assemblage is propelled lengthwise of the weld. The spring-loading may be rendered inoperative temporarily so that the vertical height of the stress-relieving assemblage may be manually controlled. A trailer T, pivotally connected to the frame F above its pivotal connection to the carriage C, cooperates with the mechanism P to support the free end of the frame and the assemblage A mounted thereon.

The assemblage A includes a pair of elongated heating heads H alined end to end but spaced apart, and a pair of elongated quenching heads Q alined end to end but spaced apart. Each heating head has a row of combustible gas outlet orifices to produce a wide flame for heating a band of the metal surface alongside the weld metal that unites two plates; and each quenching head is slightly longer than the heating head and has a row of orifices to deliver a wide spray of water or other cooling medium against the band heated by the heating head parallel to and preceding it.

A combustible gas mixture, such as a mixture of oxygen and acetylene, is supplied to the two heating heads H through pipes 10 and 10' from conventional gas mixers 11 and 11' to which oxygen and acetylene are separately delivered. A cooling agent such as water is delivered to the quenching heads Q through pipes 12 and 12' which severally are adjustably secured to the pipes 10 and 10' by clamps 13 and 13', each clamp consisting of two members respectively adjustably secured to a pair of pipes 10 and 12 (or 10' and 12') and connected together by a thumb screw, so that vertical adjustment of a quenching head relatively to a heating head may be obtained by shifting either of the pipes 10 or 12 relatively to a clamping member, or vice versa. Thus, once a quenching head Q is adjusted relatively to its associated heating head H, every adjustment of the latter will correspondingly adjust the quenching head parallel to and associated with it, so that the quenching heads will be accurately maintained in the same positions relative to their respective heating heads for every adjustment of the latter.

The gas supply pipes 10 and 10' are severally adjustably secured to elongated brackets 14 and 14' between the ends of the latter. As best shown in Figs. 6 and 7, the inner ends of these brackets are pivotally supported by pairs of pivot pins 15 and 15' threaded into opposite ends of a pivot holder D which has a third or central pair of threaded pivot pins 16 between the pins 15 and 15' to pivotally engage a bracket B adjustably secured by a split clamp B' thereof to a supporting tube E. The outer free ends of the brackets 14 and 14' carry trunnions 17 and 17' to rotatably support work-engaging wheels 18 and 18', respectively. The brackets 14 and 14' are located in the space between and extend lengthwise of the heating heads and quenching heads; and the peripheries of the wheels 18 and 18' are adjusted to project above the heating heads and quenching heads to have rolling contact with the plate and space the heads a suitable distance therefrom.

Thus, both the heating heads and the quenching heads are turnable about the pivots at their inner ends and toward or away from one another in planes perpendicular to the plate surfaces, to position the heads angularly relatively to one another to conform to or approximate the surface contour or curvature of butt-welded plates undergoing treatment, as illustrated in Fig. 3 wherein the weld zone adjoining the butt weld W that unites the curves inclined plates X, X' is undergoing treatment.

Suitable mechanism is provided to turn the brackets 14 and 14', and the heads connected thereto, about their pivots and to hold them in a desired angular position or in a horizontal position. As shown, the pivot holder D has rigidly secured thereto a depending threaded rod 20 that supports an internally threaded handwheel 21 adjustable along the rod 20 to bear against a set collar 22 on the rod. A double clevis 23 below the collar 22 is journalled on the handwheel 21 and is pivotally connected to links 24 and 24' which in turn are pivotally connected to clamps 25 and 25' secured to the pipes 10 and 10', respectively. Thus, turning the handwheel 21 in one direction will swing upwardly the free ends of the brackets and heads connected to these pipes; by turning the handwheel 21 in the reverse direction the pairs of brackets and pairs of heads are severally restored to a horizontal or alined position. The pivot holder D has a curved slot 26 to receive a clamping screw 26' threaded into the bracket B. When the assemblage A is tilted as shown in Fig. 3, the screw 26' should be adjusted to clamp the holder D to the bracket B in order to maintain the heads H parallel to tube E. When these heads are positioned as shown in Figs. 1 and 2, the clamping screw 26' is loosened to permit articulation of the assemblage A.

Means are provided to adjustably secure the tube E to the frame F and to position the brackets 14 and 14' and the heads associated therewith for operations on either flat or curved surfaces which are inclined to the horizontal. As best shown in Fig. 3, an angle plate J has its upper end rigidly secured to a clamp 27 which may be secured to either end of the tube E by cap screws 28. The lower end of the plate J is pivotally connected by a cap screw 29 to a clamp 30 which may be secured to either end of a horizontal supporting tube G carried by the upper end of the frame F. The plate J is provided with a slot 31 to receive a cap screw 32 secured to the clamp 30, whereby the plate J and the tube E and elements mounted thereon may be turned about the pivot screw 29 and secured in any one of a number of angular positions; and, since the clamps 27 and 30 and the plate J are attachable to either end of the tubes E and G, the heating and quenching heads may be tilted angularly either to the right or to the left from the horizontal, and secured in a selected position by screws 29 and 32.

Thus, the apparatus may be used for stress relieving operations on either the port or starboard side of a ship's hull, with the carriage C running lengthwise thereof in the same direction. Moreover, operations may be performed on either flat, curved or undulating welded structures and where their surfaces are either horizontal or inclined, as in stress relieving the longitudinal weld zones adjacent to the bilge keel and those between the bilge strakes.

The tube G is horizontally supported and slidable in a horizontal sleeve 33 secured in a T shaped bearing bracket 34 secured by cap screws 35 to the upper end of the tubular support 36 which constitutes the main member of the upwardly and rearwardly extending frame F. As best shown in Figs. 3 and 5, the sleeve 33 carries a pinion 37 which meshes with a longitudinal rack 38 secured to the tube G. The pinion 37 is rotatable by a handle 39 to adjust the tube G and the elements it carries horizontally and transversely of the frame member 36.

The frame F preferably is a parallel linkage arrangement which maintains the frame in a plane perpendicular to the track-supporting surface and maintains the heating and quenching heads in planes perpendicular to the plate surface regardless of the vertical height of the heads with respect to the track upon which the apparatus travels. The main frame member 36 has its lower end pivotally connected by a horizontal transverse pivot 40 to a supporting plate 41 bolted to the carriage cross slide 42 which is adjustable transversely of the carriage C by turning the handle 43. The auxiliary frame member 44 is a bar parallel to the member 36 and has its upper end pivotally connected at 45 to the outer end of the pivot arm 46 which is connected by a clamp at its inner end to the sleeve 33. The lower end of the bar 44 is pivotally connected at 47 to a bracket 48 provided with a tubular socket to slidably receive a vertical tubular stud 49 secured to the plate 41. Thus, the parallel frame members 36 and 44, the pivot arm 46 and the bracket 48 together form a parallelogram structure which will maintain the stress relieving apparatus in a vertical plane regardless of the elevation of the assemblage A.

The trailer T includes a rearwardly and downwardly extending tubular member 50 which has its upper end horizontally pivoted at 51 in a clamp 52 adjustably secured to the frame member 36 above its pivot 40. The lower end of the trailer member 50 is secured by a clamp 53 to the midportion of an axle 54 which rotatably carries a pair of trailer wheels 55 rollable along the track R. The trailer member 50 desirably is located in the same central vertical plane as the frame members 36 and 44.

The mechanism P supports part of the weight of the pivoted frame F and the elements carried thereby and is either manually or automatically operable to press the heating and quenching heads toward the plate being treated. As best shown in Figs. 1 and 4, this mechanism includes a brace rod 56, the upper end of which slidably extends through a hole in a pivoted abutment 57 carried by a clamp 58 adjustably secured to the frame member 36 above the clamp 52. The lower end of the brace rod 56 slidably extends through a hole 59' in an abutment sleeve 59 carried by and turnable in a clamp 60 adjustably secured to the trailer member 50 between its ends. A threaded shaft 61 within the sleeve 59 has a hole 61' through which the lower end of brace rod 56 freely slides when the holes 59' and 61' are in alinement. A handle 62, threadedly connected to the shaft 61 and bearing against one end of sleeve 59, is rotatable to draw shaft 61 into sleeve 59 to clamp the brace rod 56 and lock the latter against sliding through holes 59' and 61'. When the rod 56 is clamped, the sleeve 59, shaft 61 and handle 62 may turn as a unit in the clamp 60.

A helical spring 63 extends around and along the rod 56 and has its lower end bearing against the abutment sleeve 59. During automatic application of upward pressure against frame F, the upper end of the spring 63 bears against the lower end of an internally threaded handwheel 64 which is adjustable down along a similarly threaded part of the rod 56 to compress the spring 63, the handle 62 having meantime been rotated to release the rod 56 at its lower end. The pivoted frame F and this adjustment of the handwheel 64 and the spring 63 provide a floating, spring-loaded articulated supporting structure for the apparatus which will compensate automatically for all undulations in the plate as well as the varying height of the track on which the apparatus travels. As shown in Fig. 1, the pressure applying mechanism P is set to prevent free floating vertical movement of the frame by the spring 63; the rod 56 is locked at its lower end and the handwheel 64 is rotated to move it along the rod 56 so as to bear against the abutment 57 and thereby manually control the vertical position of the frame sufficiently to constantly hold the spacer wheels 18 and 18' against the work surface, as in stress relieving on curved surfaces such as along the bilge strake welds. Such manual control is necessary at times, as when stress-relieving on some curved surfaces, since spring-loading upward in such cases would cause the apparatus to skid outward.

The bracket 48 desirably is provided with a handle 66 which is useful in lifting the entire apparatus, or only the part thereof connected to the supporting plate 41 that is detachable from the carriage C. The bracket 48 also carries a plate 67 which has secured thereto the gas and water control devices, such as an oxygen regulator 68, a dual gas control valve 69 for controlling the supply of oxygen and acetylene to the mixers 11 and 11', and the several water control valves 70 for controlling the supply of water to the quenching heads Q and to the flexible nozzle N which discharges a water jet against the weld.

In performing a stress-relieving operation, the apparatus, as shown in Fig. 1, is propelled toward the right and in the direction of the arrow. During this operation, a considerable volume of water is discharged against the welded plates by the quenching heads Q and the nozzle N but, since these water discharging devices are several feet behind the electric-motor-driven carriage C, this waste water will not drain directly onto the carriage.

While the principles of this invention have been embodied in a readily portable apparatus which is well adapted for relieving stresses in butt-welded steel plates, particularly welded multi-plate structures such as ships' hulls, it will be understood that the improved apparatus is useful for supporting and propelling other tools and devices in operative relation to and along workpieces and for other operations where heating flames, with or without quenching streams, are applied to and advanced along metal surfaces. Moreover, it will be evident that certain novel features of the herein-disclosed apparatus may be used without others, and that numerous details of this apparatus may be modified without departing from the principles of the invention or sacrificing their advantages.

What is claimed is:

1. Blowpipe apparatus comprising, in combination, a heating head; and mechanism for supporting said head in operative relation to the work, said mechanism including a device attachable to a carriage movable relatively to the work, a frame member having one end thereof pivotally connected to said device, means for mounting said heating head adjacent the other end of said frame member, and adjustable means adapted to cooperate with said pivoted frame member to press said heating head toward the work, said adjustable means comprising a rigid trailer member pivotally connected to said frame member at a point between such ends thereof and spaced from the pivotal connection of said frame member to said device, and bracing means connected to both said frame member and said trailer member at points severally spaced from the pivotal connection of said trailer member to said frame member.

2. In a heating apparatus having a heating head, mechanism for supporting said head in operative relation to the work, said mechanism including a device attachable to a power-driven carriage, a frame member having one end thereof pivotally connected to said device, means for mounting said heating head adjacent the other end of said frame member, trailer means pivotally connected to said frame member at a point between such other end of said frame member and such pivotal connection thereof to said device, and adjustable means connected to and adapted to cooperate with both said frame member and said trailer means to hold said heating head in operative relation to the work to be heated.

3. Blowpipe apparatus as claimed in claim 1, wherein said adjustable means includes a spring associated with said bracing means and constructed and arranged to apply pressure against said frame member between its ends to yieldingly press said heating head toward the work.

4. Blowpipe apparatus as claimed in claim 1, wherein said bracing means includes a rod connected to said frame member and to said trailer member at points severally spaced from the pivotal connection of said trailer member to said frame member, and an element connected to said rod and adjustable relatively thereto to press said heating head toward the work.

5. Blowpipe apparatus as claimed in claim 1, wherein said bracing means includes a spring operative to apply pressure against said frame member between its ends to automatically and yieldingly press said heating head toward the work, and means for rendering said spring inoperative and for manually applying pressure against said frame member to press said heating head toward the work when said spring is inoperative.

6. Mechanism as claimed in claim 2, wherein said adjustable means includes a rod slidably connected both to said frame member between its ends and to said trailer means, means operable to lock said rod against sliding relatively to said trailer means, a helical spring surrounding said rod and constructed to apply pressure against said frame member to yieldingly and automatically press said heating head toward the work, and an element connected to and adjustable along said rod and constructed to apply pressure against said frame member to press said heating head toward the work when said rod is locked against sliding relatively to said trailer means.

7. Mechanism as claimed in claim 2, wherein said trailer means includes a bar inclined relatively to said frame member, and said adjustable means includes a clamp secured to said bar, a rod slidably connected to said frame member between its ends and also slidably connected to said clamp, a helical spring surrounding said rod between said clamp and said frame member, and a hand wheel on said rod between said spring and said frame member and adjustable along said rod.

8. In heating apparatus having a heating head, mechanism for supporting and propelling said head, said mechanism including a carriage movable along a track, an inclined frame member having one end thereof pivotally connected to said carriage, means for mounting said head adjacent the other end of said frame member, trailer means including an inclined bar pivotally connected at one end to said frame member between the ends thereof and pivotally connected at its other end to wheels movable along said track, and adjustable means connecting portions of said frame member and said bar spaced from the pivotal connection of said bar to said frame member.

9. In heating apparatus having a heating head, mechanism for supporting and propelling said head, said mechanism including a carriage movable along a track, a frame member pivotally connected at one end to said carriage and extending upwardly and rearwardly therefrom, means for mounting a heating head adjacent the upper end of said frame member, a trailer bar pivotally connected to said frame member at a point above the pivotal connection of said frame member to said carriage and extending rearwardly therefrom, trailer wheels connected to the rear end of said bar and movable along said track and toward and away from said carriage, and adjustable means for controlling the elevation of the upper end of said frame member, said adjustable means being connected to said frame member and also connected to said bar below the pivotal connection of said bar to said frame member above the pivotal connection of said bar to said frame member.

10. In a heating apparatus, a supporting device, a pair of elongated heating heads normally alined end to end, to heat co-planar surface areas; a pivot holder carried by said device and having pivots severally pivotally supporting said heads adjacent their adjoining ends, to permit adjusting said heads into an angular position relatively to one another in a plane perpendicular to a workpiece surface; and adjustable means carried by said device and connected to said heads to simultaneously turn both of said heads about their pivots to adjust said heads into such angular position.

11. In a heating apparatus, an elongated heating head; a supporting frame therefor; and adjustable means connecting said head to said frame and comprising a pair of coplanar elongated members, means for securing said head to one of said members, means for securing the other of said members to said frame, and means connecting said coplanar members and adjustable to position said members relatively to one another to hold said head horizontally to heat a horizontal surface of a workpiece and also adjustable to position said members relatively to one another to hold said head in an inclined position to heat a workpiece surface that is inclined to the horizontal.

12. In a heating apparatus, a heating head; a supporting frame therefor including an elongated horizontal member; and adjustable means for connecting said heating head to said horizontal member and including a pivoted device and means for securing said device in any position of adjustment about its pivot and selectively to either end of said horizontal member, to position said head angularly relatively to either end of said horizontal member or parallel to said horizontal member at either end thereof.

13. In a stress relieving apparatus, a pair of heating heads; a pair of quenching heads; means pivotally supporting said heating heads and said quenching heads; and adjustable means for adjusting said heating heads and said quenching heads simultaneously about their pivots to position said heating heads angularly relatively to one another and to position said quenching heads angularly relatively to one another.

14. In an apparatus operable to relieve stress in welds uniting horizontal or inclined or curved plates, a pair of elongated heating heads alined end to end but spaced apart; a pair of elongated quenching heads alined end to end and parallel to said heating heads but spaced apart; means pivotally supporting said heating heads and said quenching heads for adjustment in planes perpendicular to the plate surfaces; adjusting means for adjusting said heating heads and said quenching heads simultaneously about their pivots to position said heating heads angularly relatively to each other and to position said quenching heads angularly relatively to each other; a frame including a horizontal member for supporting said heads and their adjusting means; and means for connecting said heads and their adjusting means to said frame, including and adjustable device adapted to be secured to either end of such horizontal frame member and selectively adjustable to position said heads substantially horizontally or to position said heads angularly relatively to either end of such horizontal frame member.

15. Blowpipe apparatus for relieving stress along welded zones in welded multi-plate structures, particularly welded zones extending along the bottom portions of welded ship's hulls, such apparatus comprising, in combination, a pair of elongated heating heads alined end to end but spaced apart; a pair of elongated quenching heads alined end to end and parallel to said heating heads but spaced apart; a carriage movable lengthwise of a welded zone below the latter; a pivoted supporting member extending upwardly from said carriage and having its lower end pivotally connected to said carriage; means mounting said heating heads and said quenching heads adjacent the upper freely movable end of said pivoted supporting member, such mounting means including pivot supports pivotally supporting both said heating heads and said quenching heads for adjustment in planes perpendicular to the surface of and transverse of a welded zone, and adjusting means for adjusting both said heating heads and said quenching heads simultaneously about said pivotal supports; and means for pressing upwardly the freely movable upper end of said pivoted supporting member and thereby to hold both said heating heads and said quenching heads in operative relation to a welded zone extending along the bottom of a hull while said carriage is moved lengthwise of said welded zone below the latter.

16. In a heat treating apparatus, in combination, a carriage adapted to be propelled in a forward direction; an elongated inclined frame pivotally connected at its lower end to said carriage and extending upwardly and rearwardly therefrom; means for yieldingly supporting the upper end of said frame in an elevated position; heating means mounted adjacent the upper end of said frame for heating successive areas of a work surface above said apparatus; liquid-discharging means for discharging quenching liquid against successive areas of said work surface heated by said heating means; and means for mounting said liquid-discharging means adjacent the upper end of said frame behind said heating means and behind said carriage to inhibit drainage of waste quenching liquid by gravity onto said carriage as the latter is propelled in such forward direction.

17. In a tool supporting and propelling apparatus having a carriage adapted to move along a track and propel such apparatus, an elongated frame; means including a first pivot for pivotally connecting the lower end of said frame to said carriage so that said frame will extend upwardly from said carriage; means secured adjacent the upper end of said frame for supporting a tool or the like; and bracing means for holding the upper end of said frame and such tool-supporting means in an elevated position relatively to said carriage, said bracing means comprising trailer means having a part adapted to bear against said track, a second pivot between said first pivot and the upper end of said frame for pivotally connecting said trailer means to said frame, and adjustable means constructed and arranged to bear against said frame above said second pivot and against said trailer means to hold said frame in an elevated position.

18. In a tool supporting and propelling apparatus as claimed in claim 17, said trailer means including an elongated rigid member connected adjacent one end thereof to said frame by said second pivot, and a wheeled device movable toward and away from said carriage and connected to said rigid member adjacent the other end of the latter.

19. In a tool supporting and propelling apparatus as claimed in claim 17, said adjustable means including a rod supported by said frame and said trailer means, a spring surrounding said rod, and means for rendering said spring operative to yieldingly hold said frame in an elevated position.

20. In a tool supporting and propelling apparatus as claimed in claim 17, said adjustable means including a rod supported by said frame and said trailer means, and a device adjustable along said rod to bear against said frame above said second pivot.

21. In a heat treating apparatus having two elongated heating heads arranged end to end but spaced apart, and two elongated quenching heads arranged end to end but spaced apart and severally associated with and parallel to said heating heads; supporting means for supporting each heating head and its associated quenching head for movement relatively to the other heating head and its associated quenching head; and a single adjusting mechanism common to both heating heads and quenching heads and connected to each heating head and its associated quenching head for positioning each heating head and its quenching head relatively to the other heating head and its quenching head, to provide any one of many different relative positions of said heating heads and said quenching heads.

LLOYD W. YOUNG.

REFERENCES CITED

The following references are of record in the file of this patent:

UNITED STATES PATENTS

| Number | Name | Date |
|---|---|---|
| 1,349,167 | Pattosien | Aug. 10, 1920 |
| 1,415,414 | Strang | May 9, 1922 |
| 1,759,288 | Temple | May 20, 1930 |
| 2,206,969 | McNutt | July 9, 1940 |
| 2,266,236 | Moss et al. | Dec. 16, 1941 |
| 2,322,203 | McNutt | June 15, 1943 |
| 2,334,301 | Young | Nov. 16, 1943 |
| 2,407,370 | Hughey | Sept. 10, 1946 |
| 2,429,320 | Kennedy | Oct. 21, 1947 |

FOREIGN PATENTS

| Number | Country | Date |
|---|---|---|
| 13,280 | Great Britain | of 1884 |
| 82,922 | Switzerland | Apr. 1, 1920 |